(12) United States Patent
Jin et al.

(10) Patent No.: US 9,768,491 B2
(45) Date of Patent: Sep. 19, 2017

(54) ELECTRONIC DEVICE WITH PERIPHERAL HYBRID ANTENNA

(71) Applicant: Apple Inc., Cupertino, CA (US)

(72) Inventors: Nanbo Jin, Milpitas, CA (US); Anand Lakshmanan, San Jose, CA (US); Enrique Ayala Vazquez, Watsonville, CA (US); Erica J. Tong, Pacifica, CA (US); Hongfei Hu, Santa Clara, CA (US); Matthew A. Mow, Los Altos, CA (US); Mattia Pascolini, San Francisco, CA (US); Ming-Ju Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 14/691,304

(22) Filed: Apr. 20, 2015

(65) Prior Publication Data

US 2016/0308271 A1  Oct. 20, 2016

(51) Int. Cl.
| | |
|---|---|
| H01Q 1/24 | (2006.01) |
| H01Q 1/48 | (2006.01) |
| H01Q 1/50 | (2006.01) |
| H04B 1/3888 | (2015.01) |
| H01Q 13/10 | (2006.01) |
| H01Q 21/28 | (2006.01) |

(52) U.S. Cl.
CPC ............ *H01Q 1/243* (2013.01); *H01Q 1/48* (2013.01); *H01Q 1/50* (2013.01); *H01Q 13/103* (2013.01); *H01Q 21/28* (2013.01); *H04B 1/3888* (2013.01)

(58) Field of Classification Search
CPC  H01Q 1/243; H01Q 1/48; H01Q 1/50; H01Q 21/28; H01Q 13/103
USPC ........................................ 343/846, 848, 702
See application file for complete search history.

(56) References Cited

U.S. PATENT DOCUMENTS

| | | | |
|---|---|---|---|
| 6,373,439 B1 | 4/2002 | Zurcher et al. | |
| 6,903,693 B1 | 6/2005 | Lee et al. | |
| 7,187,329 B2 | 3/2007 | Okado | |
| 7,876,274 B2 | 1/2011 | Hobson et al. | |

(Continued)

FOREIGN PATENT DOCUMENTS

| | | |
|---|---|---|
| EP | 2500979 | 9/2012 |
| EP | 2528165 | 11/2012 |

(Continued)

OTHER PUBLICATIONS

Mow et al., U.S. Appl. No. 14/701,323, filed Apr. 30, 2015.

*Primary Examiner* — Dieu H Duong
(74) *Attorney, Agent, or Firm* — Treyz Law Group, P.C.; G. Victor Treyz; Michael H. Lyons

(57) ABSTRACT

An electronic device may have wireless circuitry with antennas. An antenna resonating element arm for an antenna may be formed from peripheral conductive structures running along the edges of a device housing. Elongated conductive members may longitudinally divide openings between the peripheral conductive housing structures and the ground. The elongated conductive members may extend from an internal ground to outer ends of the elongated conductive members that are located adjacent to the gaps. Transmission lines may extend along the elongated conductive members to antenna feeds at the outer ends. The elongated conductive members may form open slots that serve as slot antenna resonating elements for the antenna.

21 Claims, 9 Drawing Sheets

(56) References Cited

U.S. PATENT DOCUMENTS

| | | |
|---|---|---|
| 8,270,914 B2 | 9/2012 | Pascolini et al. |
| 8,531,344 B2 | 9/2013 | Ayatollahi et al. |
| 8,610,629 B2 | 12/2013 | Pascolini et al. |
| 8,665,164 B2 | 3/2014 | Hill et al. |
| 8,798,554 B2 | 8/2014 | Darnell et al. |
| 8,836,587 B2 | 9/2014 | Darnell et al. |
| 8,860,619 B2 | 10/2014 | Nyssen |
| 8,872,706 B2 | 10/2014 | Caballero et al. |
| 8,947,302 B2 | 2/2015 | Caballero et al. |
| 9,024,823 B2 | 5/2015 | Bevelacqua |
| 9,236,659 B2 * | 1/2016 | Vazquez .............. H01Q 13/103 |
| 2011/0241949 A1 | 10/2011 | Nickel et al. |
| 2012/0112969 A1 | 5/2012 | Caballero et al. |
| 2012/0299785 A1 * | 11/2012 | Bevelacqua ............. H01Q 9/42 343/702 |
| 2013/0169490 A1 | 7/2013 | Pascolini et al. |
| 2013/0201067 A1 | 8/2013 | Hu et al. |
| 2013/0257659 A1 | 10/2013 | Darnell et al. |
| 2014/0266922 A1 | 9/2014 | Jin et al. |
| 2014/0266923 A1 | 9/2014 | Zhou et al. |
| 2014/0266938 A1 | 9/2014 | Ouyang et al. |
| 2014/0266941 A1 | 9/2014 | Vazquez et al. |
| 2014/0292598 A1 | 10/2014 | Bevelacqua et al. |
| 2014/0306857 A1 | 10/2014 | Bevelacqua et al. |
| 2014/0327584 A1 | 11/2014 | Chang |
| 2014/0333495 A1 | 11/2014 | Vazquez et al. |
| 2014/0333496 A1 | 11/2014 | Hu et al. |
| 2015/0207212 A1 * | 7/2015 | Martiskainen ......... H01Q 21/30 343/702 |

FOREIGN PATENT DOCUMENTS

| | | |
|---|---|---|
| EP | 2621017 | 7/2013 |
| TW | 201507264 | 2/2015 |
| WO | 2016/028592 | 2/2016 |
| WO | 2016/101871 | 6/2016 |

* cited by examiner

ELECTRONIC DEVICE WITH PERIPHERAL HYBRID ANTENNA

BACKGROUND

This relates generally to electronic devices and more particularly, to electronic devices with wireless communications circuitry.

Electronic devices often include wireless circuitry with antennas. For example, cellular telephones, computers, and other devices often contain antennas for supporting wireless communications.

It can be challenging to form electronic device antenna structures with desired attributes. In some wireless devices, the presence of conductive structures such as conductive housing structures can influence antenna performance. Antenna performance may not be satisfactory if the housing structures are not configured properly and interfere with antenna operation. Device size can also affect performance. It can be difficult to achieve desired performance levels in a compact device, particularly when the compact device has conductive housing structures.

It would therefore be desirable to be able to provide improved wireless circuitry for electronic devices such as electronic devices that include conductive housing structures.

SUMMARY

An electronic device may have wireless circuitry with antennas. The device may have a housing such as a rectangular housing with four edges. The housing may have conductive structures such as peripheral conductive structures that run along the edges of the housing.

Antennas may be formed from openings between peripheral conductive housing structures and an internal ground. The openings may extend along one or more of the edges of the housing. For example, an antenna may be formed using a U-shaped opening that runs along the edges of one of the ends of a rectangular device housing.

An antenna resonating element arm for an antenna may be formed from a portion of the peripheral conductive structures that extends between gaps in the peripheral conductive structures. Elongated conductive members may longitudinally divide portions of the U-shaped opening between the peripheral conductive housing structures and the ground. The elongated conductive members may extend from a portion of the ground to outer ends located adjacent to the gaps.

Transmission lines may extend along the elongated conductive members to antenna feeds at the outer ends. The antenna feeds may each have a ground terminal coupled to one of the outer ends and a positive terminal coupled to a portion of the antenna resonating element arm adjacent to one of the gaps. The elongated conductive members may form open slots that serve as slot antenna resonating elements for the antenna.

DETAILED DESCRIPTION

Figure 1:
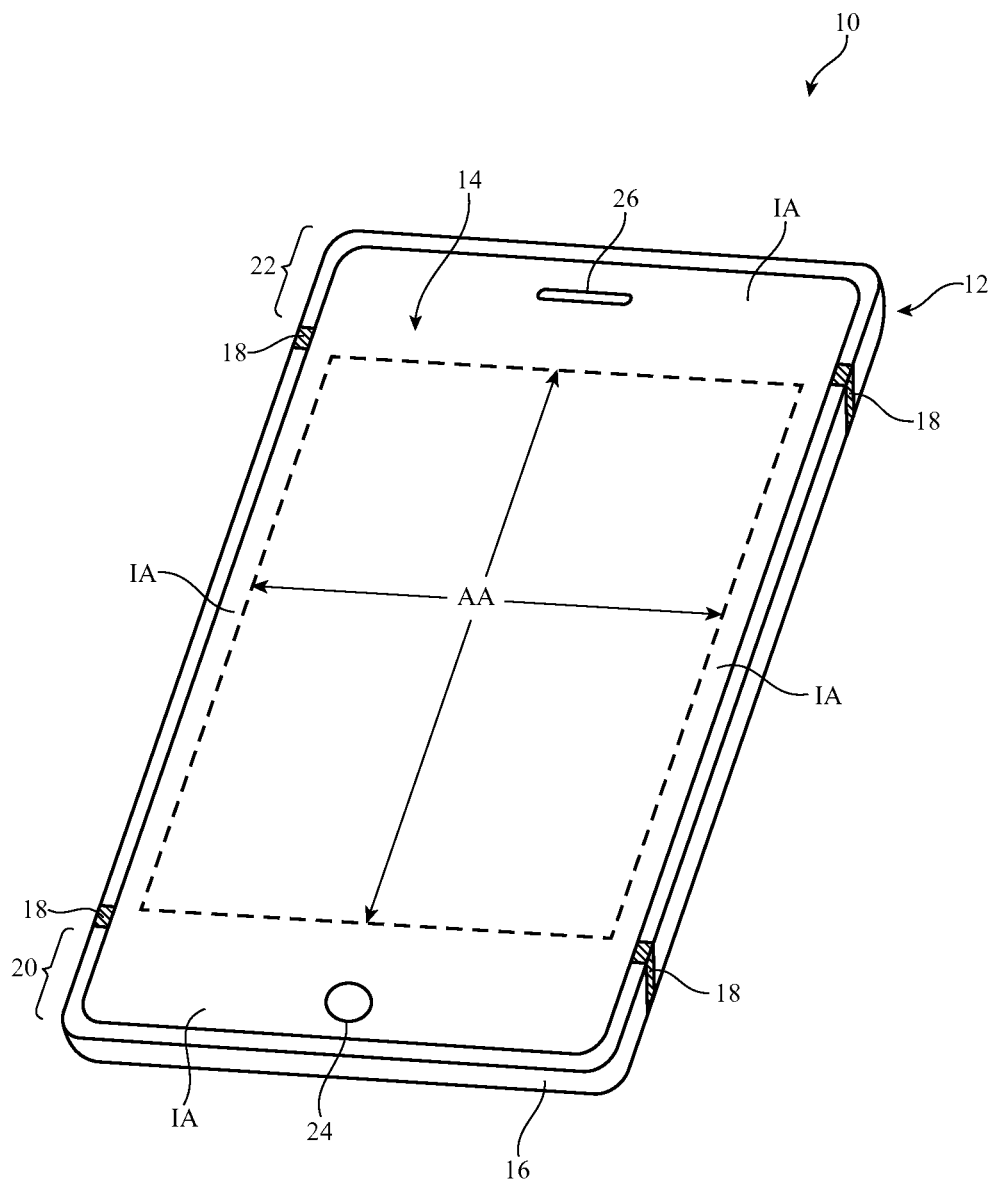
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing, structures. The housing structures may include peripheral structures such as peripheral conductive structures that run around the periphery of an electronic device. The peripheral conductive structure may serve as a bezel for a planar structure such as a display, may serve as sidewall structures for a device housing may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass ceramics, fiber composites, metal (e.g., stainless steel, aluminum, etc.), other suitable materials, or a combination of these materials. In some situations parts of housing 12 may be formed from dielectric or other low-conductivity material. In other situations, housing 12 or at least some of the structures that make up housing 12 may be formed from metal elements.

Device 10 may if desired, have a display such as display 14. The rear face of housing 12 may have a planar housing wall. The rear housing wall may be separated into first and second portions by a gap that is filled with plastic or other dielectric. Conductive structures may electrically couple the first and second portions together. Display 14 may be mounted on the opposing front face of device 10 from the rear housing wall. Display 14 may be a touch screen that incorporates capacitive touch electrodes or may be insensitive to touch.

Display 14 may include pixels formed from light-emitting diodes (LEDs) organic LEDs (OLEDs), plasma cells, electrowetting pixels electrophoretic pixels, liquid crystal display (LCD) components, or other suitable pixel structures. A display cover layer such as a layer of clear glass or plastic May cover the surface of display 14 or the outermost layer of display 14 may be formed from a color filter layer, thin-film transistor layer or other display layer. Buttons such as button 24 may pass through openings in the cover layer. The cover layer May also have other openings such as an opening, for speaker port 26.

Housing 12 may include peripheral housing structures such as structures 16. Structures 16 may run around the periphery of device 10 and display 14. In configurations in which device 10 and display 14 have a rectangular shape with four edges structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also if desired form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures peripheral metal structures, or a peripheral conductive housing member (as examples). Peripheral housing structures 16 may be formed from a metal such as stainless steel, aluminum, or other suitable materials. One two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 1 as integral, portions of the housing structures forming the rear surface of housing 12. For example, a rear housing wall of device 10 may be formed from a planar metal structure and portions of peripheral housing structures 16 on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more two or more, or three or more portions.

Display 14 may have an array of pixels that form an active area AA that displays images for a user of device 10. An inactive border region such as inactive area 1A may run along one or more of the peripheral edges of active area AA.

Display 14 may include conductive structures such as an array of capacitive electrodes for a touch sensor conductive lines for addressing pixels, driver circuits, etc. Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 16). Device 10 may also include conductive structures such as printed circuit boards, components mounted on printed circuit hoards, and other internal conductive structures. These conductive structures, which may be used in forming a ground plane in device 10, may be located in the center of housing 12 and may extend under active area AA of display 14.

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air plastic, and other dielectrics and may be used in forming slot antenna resonating elements for one or more antennas in device 10.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22. In configurations for device 10 with narrow U-shaped openings or other openings that run along the edges of device 10, the ground plane of device 10 can be enlarged to accommodate additional electrical components (integrated circuits, sensors, etc.)

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four gaps 18, etc.). The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 16 and may form antenna slots gaps 18, and other structures in device 10. Polymer or other dielectric may fill these grooves and other housing openings. In some situations, housing openings that form antenna slots and other structure may be filled with a dielectric such as air.

In a typical scenario, device 10 may have upper and lower antennas as an example). An upper antenna may for example, be formed at the upper end of device 10 in region 22. A lower antenna may for example be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
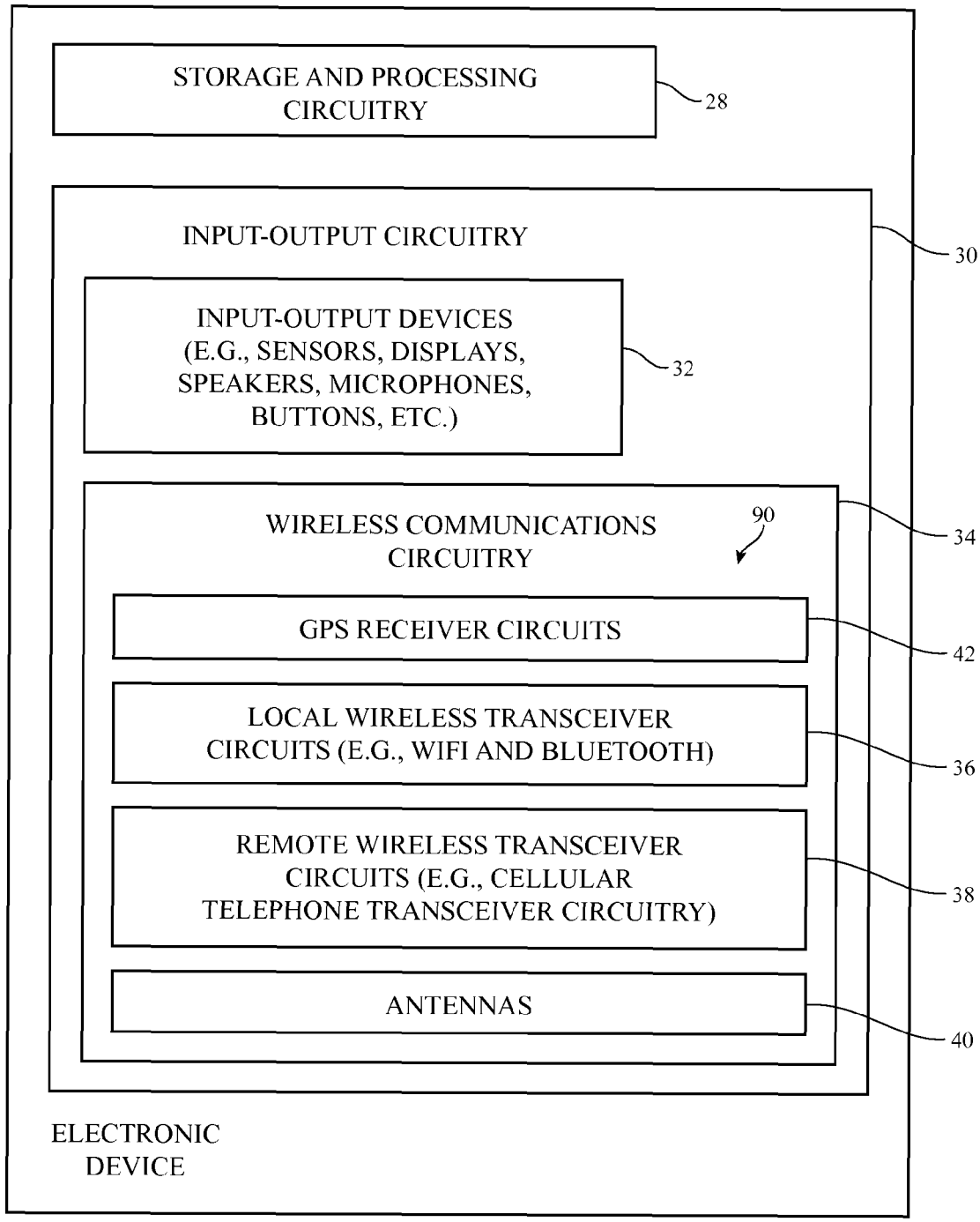
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2 device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive) volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors application specific integrated circuits, etc.

Storage and processing circuitry 28 may be used to run software on device 10 such a internet browsing applications, voice-over-internet-protocol (VOIP) telephone call applications email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include use interface devices, data port devices, and other input-output components. For example, input-output devices 32 may include touch screens, displays without touch sensor capabilities, buttons joysticks, scrolling wheels, touch pads, key pads, keyboards, microphones, cameras, buttons, speakers, status indicators, light sources, audio jacks and other audio port components, digital data port devices, light sensors, motion sensors accelerometers), capacitance sensors, proximity sensors, fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a low-midband from 1400-1520 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NEC) circuitry, etc. Wireless communications circuitry 34 may include global positioning system ((GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures hybrids of these designs, etc. Different types of antennas May be used for different bands and combinations of bands. For example, one type of antenna may be used in forming a local wireless link antenna and another type of antenna may be used in forming a remote wireless link antenna.

Figure 3:
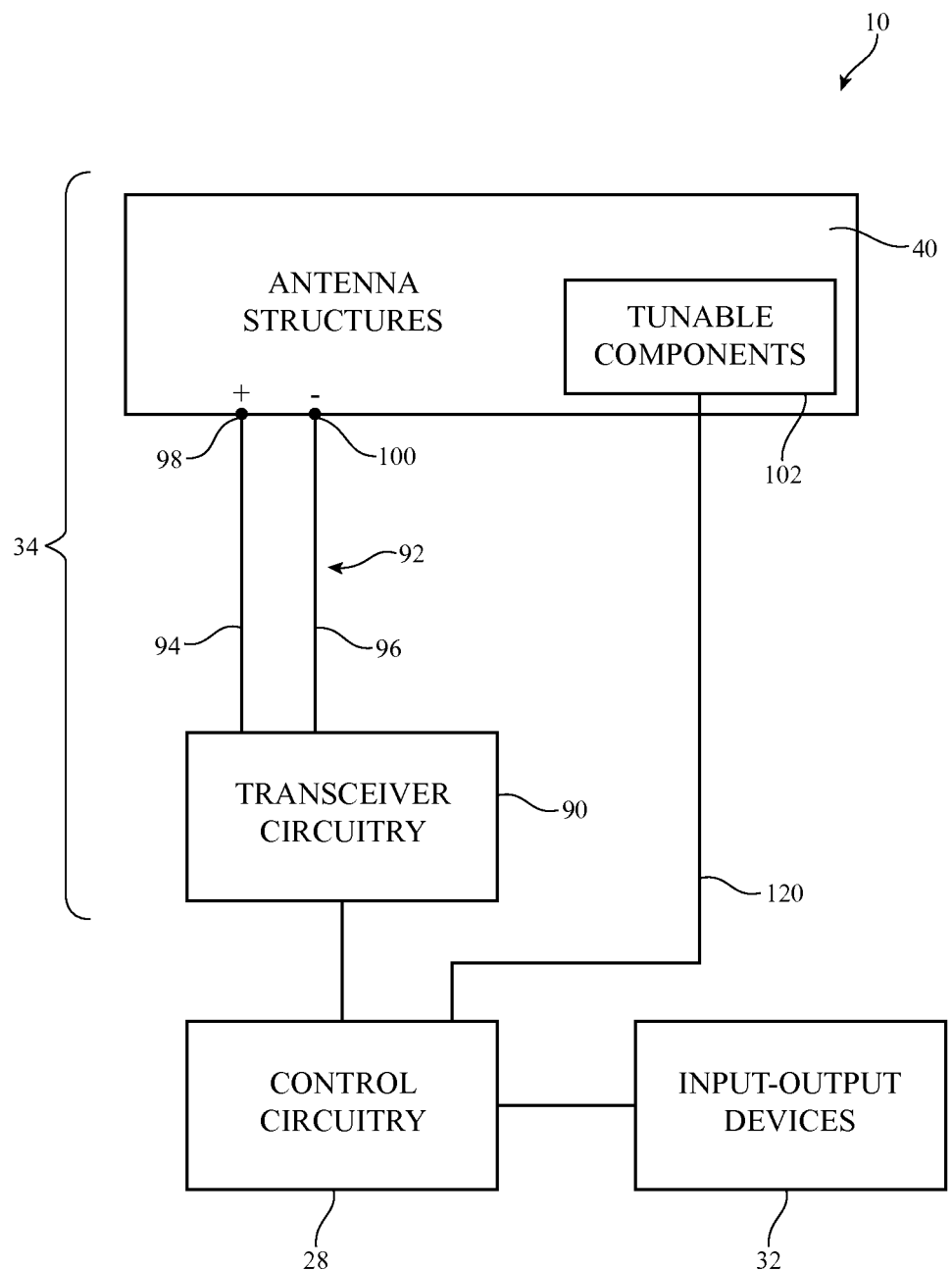
FIG. 3 is a schematic diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antennas) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc. Tunable components 102 may include tunable inductors tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 120 that adjust inductance values, capacitance values, or other parameters associated with tunable components 102, thereby tuning antenna structures 40 to cover desired communications bands.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna(s) 40 to the impedance of transmission line 92. Matching network components may be provided as discrete components (e.g., surface mount technology components) or may membered from housing structures, printed circuit hoard structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground, transmission line conductor 96 may be coupled to ground antenna feed terminal 92. Other types of antenna feed arrangements may be used if desired. For example, antenna structures 40 may be fed using multiple feeds. The illustrative feeding configuration of FIG. 3 is merely illustrative.

Control circuitry 28 may use an impedance measurement circuit to gather antenna impedance information. Control circuitry 28 may use information from a proximity sensor (see, e.g., sensors 32 of FIG. 2), received signal strength information, information from one or more antenna impedance sensors, or other information in determining when antenna 40 is being affected by the presence of nearby external objects or is otherwise in need of tuning. In response, control circuitry 28 may adjust an adjustable inductor or other tunable component 102 to ensure that antenna 40 operates as desired. Adjustments to component 102 may also be made to extend the coverage of antenna 40 (e.g., to cover desired communications bands that extend over a range of frequencies larger than antenna 40 would cover without tuning).

Figure 4:
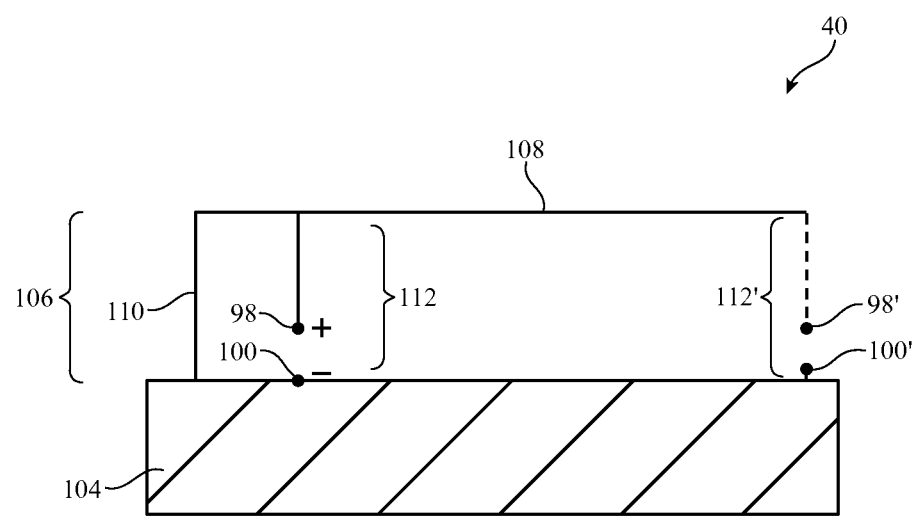
FIG. 4 is a schematic diagram of an illustrative inverted-F antenna in accordance with an embodiment.

FIG. 4 is a diagram of illustrative inverted-F antenna structures that may be used in implementing antenna 40 for device 10. Inverted-F antenna 40 of FIG. 4 has antenna resonating element 106 and antenna around (ground plane) 104. Antenna resonating element 106 may have a main resonating element arm such as arm 108. The length of arm 108 and/or portions of arm 108 may be selected so that antenna 40 resonates at desired operating frequencies. For example, if the length of arm 108 may be a quarter of a wavelength at a desired operating frequency for antenna 40. Antenna 40 may also exhibit resonances at harmonic frequencies.

Main resonating element arm 108 may be coupled to around 104 by return path 110. An inductor or other component may be interposed in path 110 and/or tunable components 102 may be interposed in path 110 and/or coupled in parallel with path 110 between arm 108 and around 104.

Antenna 40 may be fed using one or more antenna feeds. For example, antenna 40 may be fed using antenna feed 112. Antenna feed 112 may include positive antenna feed terminal 98 and around antenna feed terminal 100 and may run in parallel to return path 110 between arm 108 and around 104. Antenna 40 may also be feed by a feed that is located at the end of arm 108 such as feed 112'. Feed 112' include positive antenna feed terminal 98' coupled to arm 108 and round antenna feed 100' coupled around 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components to support antenna tuning, etc.). For example arm 108 may have left and right branches that extend outwardly from feed 112 and return path 110. Multiple feeds may be used to feed antennas such as antenna 40.

Figure 5:
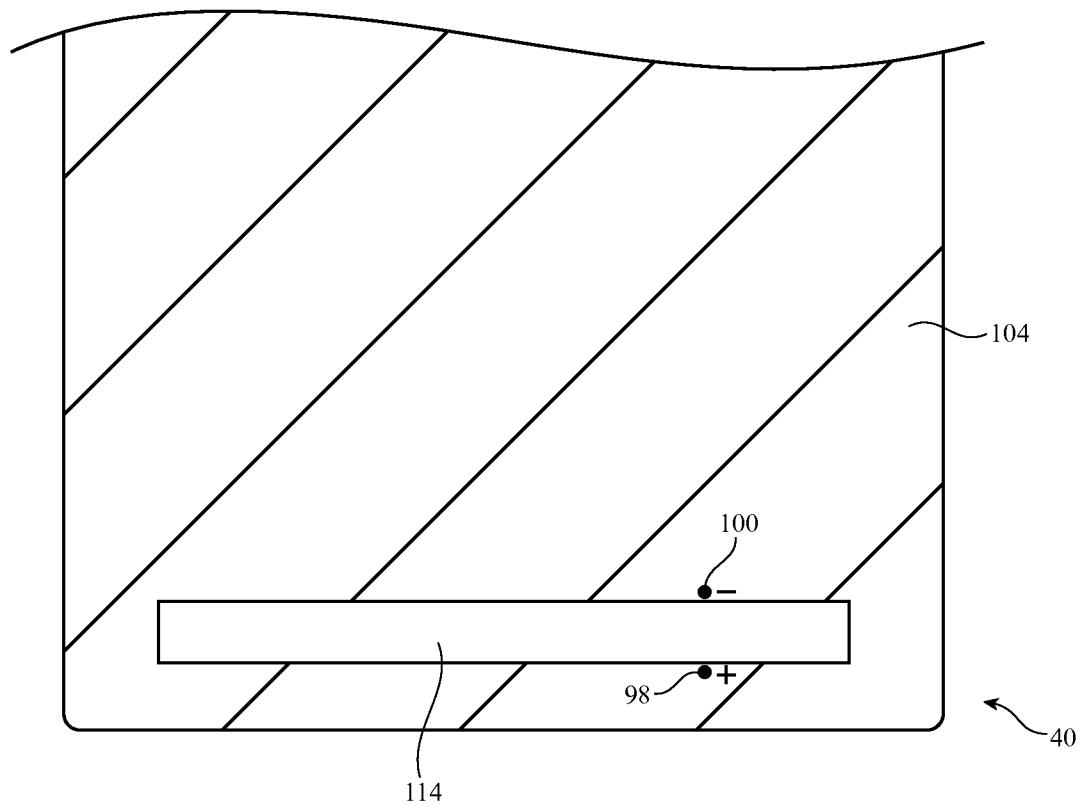
FIG. 5 is a schematic diagram of an illustrative slot antenna in accordance with an embodiment of the present invention.

Antenna 40 may be a hybrid antenna that includes one or more slot antenna resonating elements. As shown in FIG. 5 for example antenna 40 may be based on a slot antenna configuration having an opening such as slot 114 that is formed within antenna ground 104. Slot 114 may be filled with air, plastic, and/or other dielectric. The shape of slot 114 may be straight or may have one or more bends (i.e., slot 114 may have an elongated shape following a meandering path). The antenna feed for antenna 40 may include positive antenna feed terminal 98 and around antenna feed terminal 100. Feed terminals 98 and 100 may for example, be located on opposing sides of slot 114 (e.g., on opposing long sides). Slot-based antenna resonating elements such as slot antenna resonating element 114 of FIG. 5 may give rise to an antenna resonance at frequencies in which the wavelength of the antenna signals is equal to the perimeter of the slot. In narrow slots, the resonant frequency of a slot antenna resonating element is associated with signal frequencies at which the slot length is equal to a half of as wavelength. Slot antenna frequency response can be tuned using one or more tunable components such as tunable inductors or tunable capacitors. These components may have terminals that are coupled to opposing sides of the slot (i.e., the tunable components may bridge the slot). If desired, tunable components may have terminals that are coupled to respective locations along the length of one of the sides of slot 114. Combinations of these arrangements may also be used.

Figure 6:
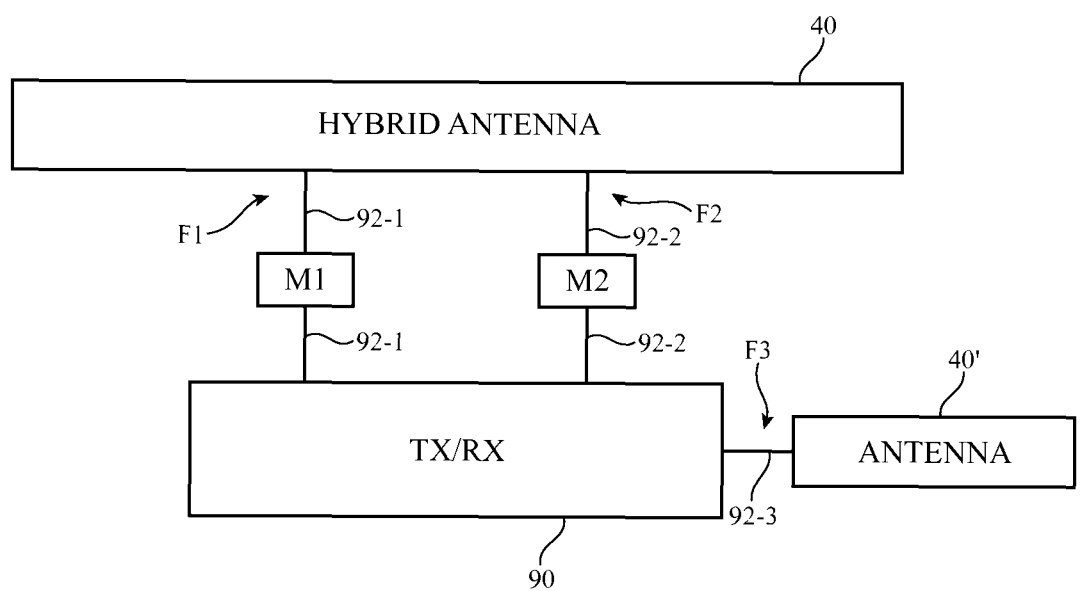
FIG. 6 is a diagram of illustrative antenna structures and antenna feeds in accordance with an embodiment.

Antenna 40 may be a hybrid slot-inverted-F antenna that includes resonating elements of the type shown in both FIG. 4 and FIG. 5. An illustrative feeding arrangement for a hybrid antenna of this type is shown in FIG. 6. As shown in FIG. 6, hybrid antenna 40 (e.g., a hybrid slot-inverted-F antenna) may be fed by transceiver circuitry 90 using a first feed such as feed F1 and a second feed such as feed F2. Transceiver circuitry 90 may have a first port that is coupled to feed F1 using transmission line 92-1 and a second port that is coupled to feed F2 using transmission line 92-2. If desired tunable and/or fixed impedance matching circuits such as matching circuits M1 and M2 may be interposed in paths 92-1 and 92-2. Additional antenna structures such as antenna 40 (e.g., example elements or other types of antennas) may be fed using transceiver circuitry 90 and may help enhance the frequency coverage of antenna 40. In the example of FIG. 6, antenna 40' is feed at feed F3 by coupling a third port of circuitry 90 to antenna 40 using transmission line 92-3, but other feeding arrangements may be used if desired (e.g., a feeding arrangement in which one of feeds F1 and F2 is used in feeding, element 40). A matching circuit may be interposed in path 92-3, if desired. Antenna 40' may be used to provide local wireless local area network coverage at 2.4 and/or 5 GHz while antenna 40 is used to cover satellite navigation and cellular bands and/or antenna 40' may be used to provide coverage in other suitable frequency bands. If desired, additional antenna element 40' may be omitted or more than one additional element such as element 40' may be included in device 10. Antenna elements such as antenna element 40' may be located at ends 20 and/or 22 or elsewhere in device 10.

Figure 7:
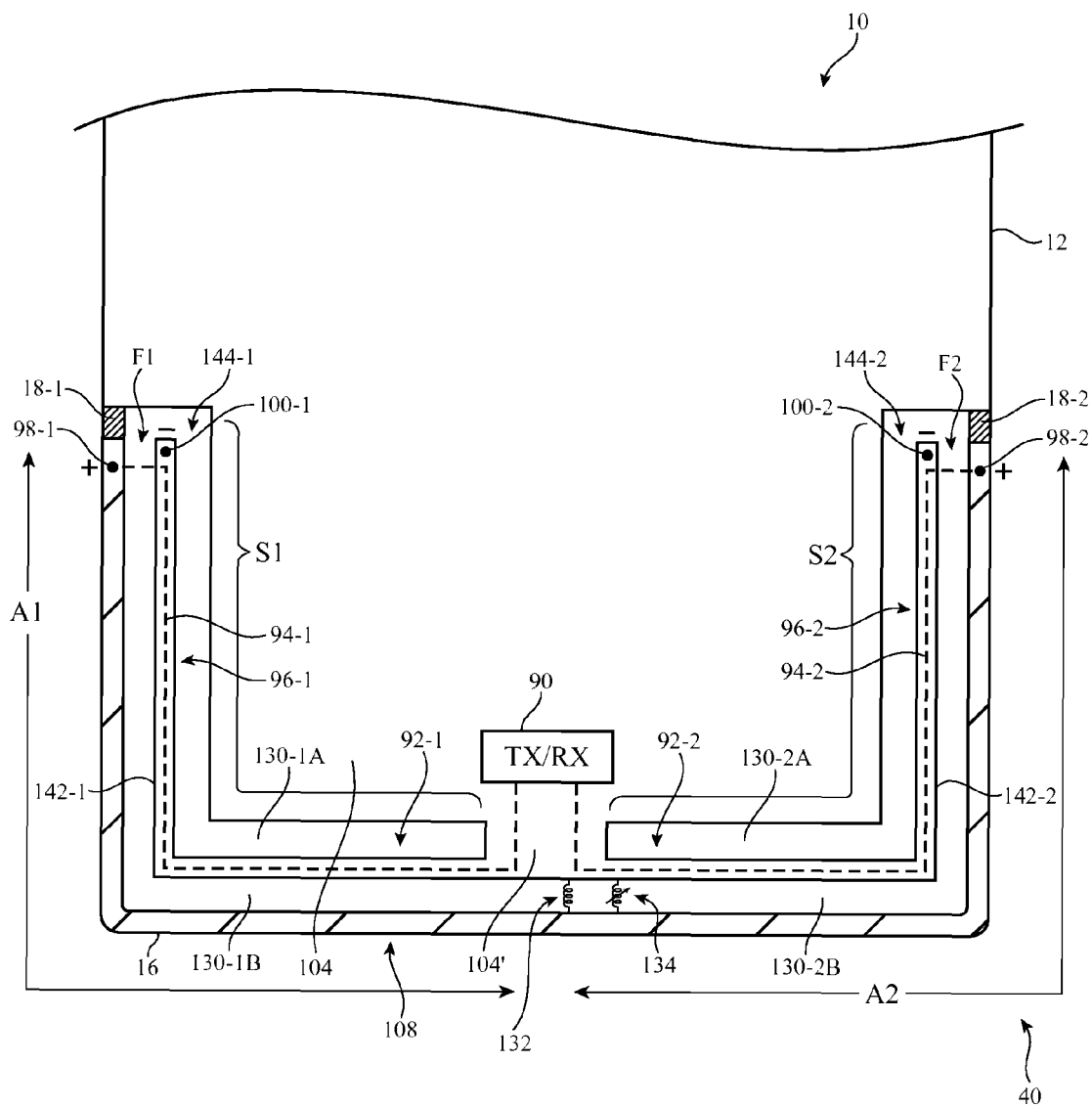
FIG. 7 is a diagram of an illustrative hybrid inverted-F slot antenna in accordance with an embodiment.

An interior view of device 10 showing an illustrative configuration that may be used for a dual-feed hybrid antenna is shown in FIG. 7. As shown in FIG. 7, antenna 40 may have an inverted-F antenna resonating element arm such as arm 108 formed from peripheral conductive structures 16. Arm 108 has a first end that is separated from ground plane 104 at gap 18-1 and a second end that is separated, from ground plane 104 at gap 18-2. An elongated, opening may separate arm 108 from ground plane 104. The elongated opening may have a U-shape that runs along three peripheral edges of device 10 or may have other shapes. Antenna arm 108 may have a first branch such as branch A1 and a second branch such as branch A2. The end of branch A1 at feed F1 may be fed using positive antenna feed terminal 98-1 and ground antenna feed terminal 100-1. The end of branch A2 (i.e., the opposing end of arm 108) at feed F2 may be fed using positive antenna feed terminal 98-2 and ground antenna feed terminal 100-2.

A central portion of ground plane 104 may extend downwards to form ground plane protrusion 104'. Ground plane protrusion 104' may branch out to form two opposing elongated (strip-shaped) conductive members: conductive member 142-1 and conductive member 142-2. Conductive members 142-1 and 142-2 may be formed from machined metal portions of housing 12, metal traces on a plastic support structures (e.g., traces patterned using laser direct structuring techniques in which portions of a plastic support are selectively activated by exposure to laser light to promote localized metal plating during subsequent electroplating operations) stamped metal foil, wire, or other elongated conductive structures. Structures such as conductive members 142-1 and 142-2 may be supported by plastic that is molded into the opening between arm 108 and ground plane 104, may be supported on a printed circuit or other substrate, or may be partly or full) suspended in an between arm 108 and ground plane 104.

Radio-frequency transceiver circuitry 90 may be coupled to antenna feeds F1 and 12 at the outer ends of elongated conductive members 142-1 and 142-2 using respective transmission lines such as transmission lines 92-1 and 92-2. Transmission line 92-1 may include positive signal path 94-1 and associated ground signal conductor 96-1. Transmission line 92-2 may include positive signal path 94-2 and ground signal path 96-2. Transmission lines 92-1 and 92-1 extend along respective elongated members 142-1 and 142-2 and couple transceiver circuitry 90 to respective feeds F1 and F2. If desired, coaxial cables, flexible printed circuit cables, or other cables may be used in forming transmission lines 92-1 and 92-2. For example, a first coaxial cable may run along member 142-1 and a second coaxial cable may run along member 142-2. The center conductors of the first and second coaxial cables may form positive signal paths 94-1 and 94-2. The outer conductors of the first and second coaxial cables may form ground signal paths 96-1 and 96-2 and may be shorted to respective ground feed terminals 100-1 and 100-2 at the ends of members 142-1 and 142-2. If desired, the outer conductors of the cables may also be shorted to members 142-1 and 142-2 at one or more positions along the lengths of members 142-1 and 142-2. Members 142-1 and 142-2 may be separate from the ground conductors in transmission lines 92-1 and 92-1 (i.e., members 142-1 and 142-2 may be separate from the outer ground conductor in the first and second coaxial cables) or members 142-1 and 142-2 may form some or all of ground signal paths 96-1 and 96-2.

The opening between arm 108 and ground 104 may have a shape that runs along one or more edges of device 10. In the example of FIG. 7, the opening between arm 108 and ground 104 has a U-shape that runs along a portion of the lower left edge of device 10, the bottom edge of device 10, and a portion of the lower right edge of device 10. Ground protrusion 104' laterally bisects this opening into left and right halves. The left half of the opening is bisected along its length the left opening is longitudinally divided) by member 142-1 to form openings 130-1A and 130-1B. The right half of the opening is bisected along its length the right opening is longitudinally divided) by member 142-2 to form openings 130-2A and 130-2B. Openings 130-1A, 130-1B, 130-2A, and 130-2B may have the shape of elongated strips and may sometimes be referred to as slot-shaped openings or slots. Slots such as open slots 130-1A and 130-2A may form slot antenna resonating elements that contribute to the frequency coverage of antenna 40. The lengths of openings 130-1A, 130-1B, 130-2A, and 130-2B may be 1-20 cm, more than 3 cm, more than 7 cm, less than 30 cm, less than 20 cm, less than 10 cm, or other suitable lengths. The widths of openings 130-1A, 130-1B, 130-2A, and 130-2B 1 may be 0.5-5 mm, may be 1-3 mm, may be more than 0.2 mm, may be more than 1 mm, may be less than 3 mm, may be less than 6 mm, or may be any other suitable width.

Opening 130-1A may have a closed end at the left side a ground protrusion 104' and an opposing open end such as open end 144-1. Opening 130-2A may have a closed end at the right side of ground protrusion 104' and an opposing open end such as open end 144-2. Openings 130-1A and 130-2A may form first and second respective open-ended slots S1 and S2 (sometimes referred to as open slots or open slot resonating elements). In the illustrative configuration of FIG. 7, the open ends of slots S1 and S2 are not bridged by positive signal conductors 94-1 and 94-2, because conductors 94-1 and 94-2 run along members 142-1 and 142-2 from ground protrusion 104' and terminate at respective positive antenna feed terminals 98-1 and 98-2 on the opposing ends of arm 108.

As shown in FIG. 7, components such as inductor 132 and tunable inductor 134 (or other tunable component 102) may span the gap (130-1B and/or 130-2B) between arm 108 and ground protrusion 104' of ground 104. Arm 108 may have branches such as arm A1 and arm A2. Arm A1 may extend between gap 18-1 at feed F1 and components 132 and 134. Arm A2 may extend between gap 18-2 at feed F2 and components 132 and 134. Slots S1 and S2 and arms A1 and A2 form portions of a hybrid inverted-F slot antenna (antenna 40). The lengths of open slots S1 and S2 and the lengths of respective branches (arms) A1 and A2 of resonating element (arm) 108 may form antenna resonance peaks that help ensure that antenna 40 will operate it desired communications bands.

Figure 8:
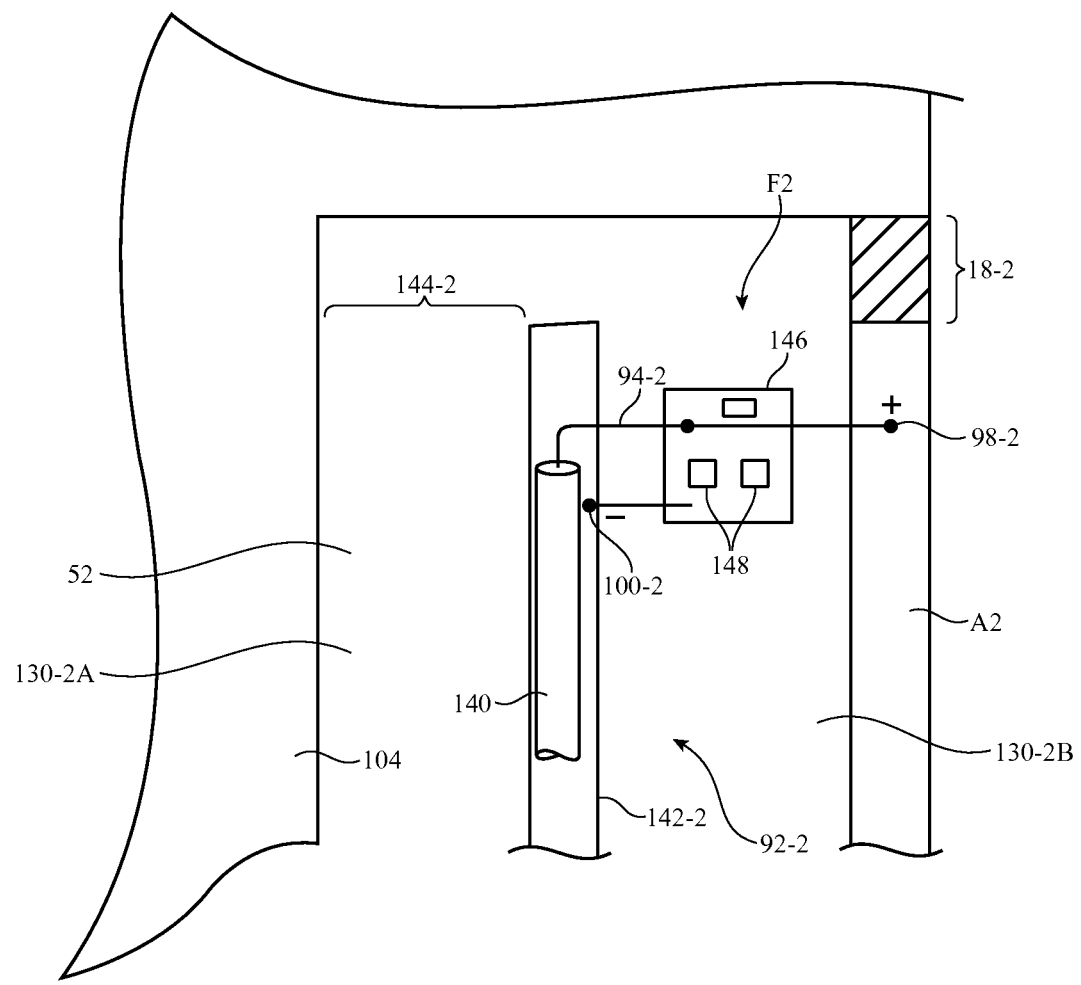
FIG. 8 is a diagram of an illustrative matching circuit and antenna feed configuration of the type that may be used in feeding an antenna of the type shown in FIG. 7 in accordance with an embodiment.

FIG. 8 shows how a cable such as coaxial cable 140 may run along member 142-2 (the arrangement for member 142-1 may be similar). In the example of FIG. 8, cable 140 has a center conductor that forms positive transmission line path 94-2 and an outer ground conductor that from ground transmission line path 96-2 (i.e., cable 140 of FIG. 8 may form transmission line 92-2). At feed F2, positive transmission line path 94-2 extends across opening 130-2B and is shorted to positive antenna feed terminal 98-2 at the end of arm A2. Impedance matching circuitry for feed F2 (matching circuit M2) may be formed from electrical components 148 mounted on substrate 146 (as an example). The impedance matching circuitry may be interposed in transmission line 92-2 and may be coupled to positive feed terminal 98-2 and ground feed terminal 100-2 (which is formed by terminating the ground conductor of path 92-2 at the outer end of member 142-2). Structures of the type shown in FIG. 8 may be used for both feed F2 and feed F1. The impedance matching circuitry may be fixed or may be tunable (see, e.g., tunable components 102).

Figure 9:
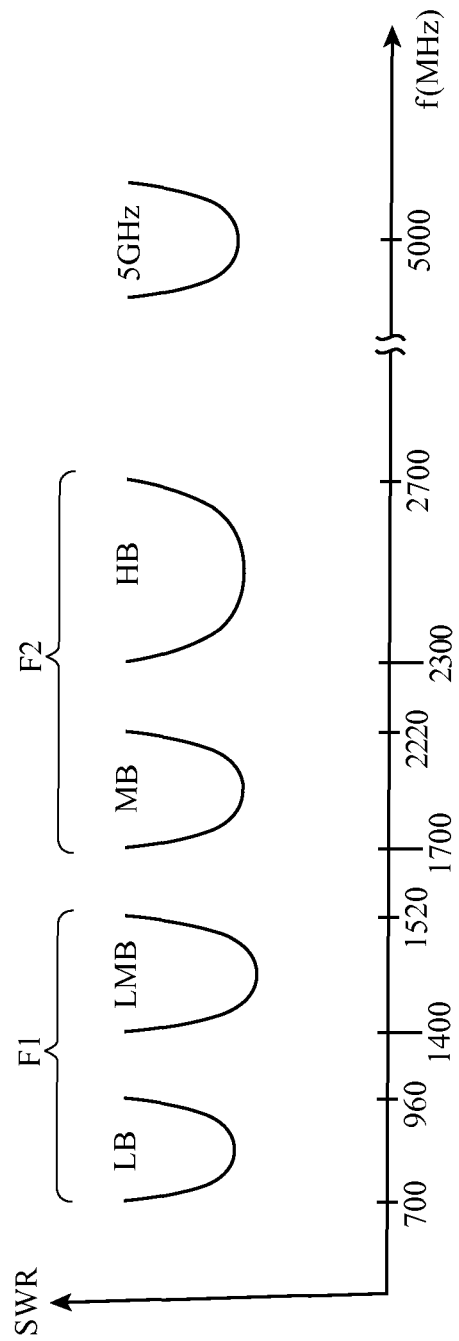
FIG. 9 is a graph in which antenna performance (standing-wave ratio) has been plotted as a function of operating frequency for an illustrative electronic device antenna in accordance with an embodiment.

FIG. 9 is a graph in which antenna performance (standing-wave ratio SWR) has been plotted as a function of operating frequency f for an illustrative antenna such as antenna 40 of FIG. 7. As shown in FIG. 9, antenna 40 may exhibit resonances in a low band LB, low-middle band LMB, midband MB, and high band HB. Low band LB may extend from 700 MHz to 960 MHz, low midband LMB may extend from 1400 MHz to 1520 MHz, midband MB may extend from 1700 MHz to 2200 MHz, and high band HB may extend from 2300 MHz to 2700 MHz (as examples). The resonance at low band LB may be associated with the length of arm A2. The resonance at low mid-band LMB may arise from the length of slot S2. The length of arm A1 may give rise to the resonance at mid-band MB. The resonance at high band HB may be generated from the length of slot. S1. Higher-order resonances associated with the length of slot S1 may support an antenna response at higher frequencies such as 5 GHz. If desired, an additional antenna structure such as antenna structure 40' of FIG. 6 (e.g., a monopole, etc.) may be used in supporting coverage at 5 GHz.

Antennas such as antenna 40 of FIG. 7 may be formed at the lower end of device 10, at the upper end of device 10, at both the upper and lower ends of device 10, or elsewhere in device 10. Different ranges of frequencies may be covered by adjusting components 132 and 134 and/or the shapes of arms A1 and A2 and slots S1 and S2. Slots S1 and S2 and arms A1 and A2 may be formed along one edge of device 10, along two edges of device 10, along three edges of device 10 (as shown in FIG. 7), or along four edge of device 10 (as examples). The configuration of FIG. 7 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having peripheral conductive structures;
   an antenna that has an antenna resonating element arm formed from the peripheral conductive structures, that has an antenna ground that is separated from the antenna resonating element arm by an elongated opening that runs along at least one edge of the housing, and that has an elongated conductive member within the elongated opening that forms an open slot between the elongated conductive member and the antenna ground;
   a first pair of antenna feed terminals and a first transmission line that are coupled to the antenna and that convey radio-frequency signals for the open slot and a first portion of the antenna resonating element arm; and
   a second pair of antenna feed terminals and a second transmission line that are coupled to the antenna and that convey radio-frequency signals for a second portion of the antenna resonating element arm.

2. The electronic device defined in claim 1 wherein the elongated conductive member has opposing first and second ends, the antenna ground has a portion from which the first end of the elongated conductive member extends and that forms a closed end for the open slot, and the open slot has an opposing open end at the second end of the elongated conductive member.

3. The electronic device defined in claim 2 wherein the first pair of antenna feed terminals is located at the second end of the elongated conductive member.

4. The electronic device defined in claim 3 wherein the peripheral conductive structures have at least one gap that separates the first portion of the antenna resonating element arm from the antenna ground and the antenna resonating element arm has an end at the gap.

5. The electronic device defined in claim 4 wherein the first pair of antenna feed terminals includes a ground antenna feed terminal on the second end of the elongated conductive member.

6. The electronic device defined in claim 5 wherein the first pair of antenna feed terminals includes a positive antenna feed terminal on the end of the antenna resonating element arm adjacent to the gap.

7. The electronic device defined in claim 6 further comprising:
   radio-frequency transceiver circuitry, wherein the first transmission line extends along the elongated conductive member between the radio-frequency transceiver circuitry and the first pair of antenna feed terminals.

8. The electronic device defined in claim 7 further comprising at least one electrical component that is coupled to the antenna resonating element arm.

9. The electronic device defined in claim 8 wherein the elongated conductive member is separated from the antenna resonating element arm by a slot-shaped opening and the electrical component is coupled across the slot-shaped opening.

10. The electronic device defined in claim 9 wherein the electrical component comprises a tunable inductor.

11. The electronic device defined in claim 10 further comprising a fixed inductor that is coupled across the slot-shaped opening.

12. The electronic device defined in claim 11 further comprising:
   an additional gap in the peripheral conductive structures, wherein the second portion of the antenna resonating element arm is separated from the antenna ground by an additional elongated opening; and
   an additional elongated conductive member that longitudinally divides the additional elongated opening and that forms an additional open slot for the antenna.

13. The electronic device defined in claim 12 wherein the second transmission line extends along the additional elongated conductive member from the transceiver circuitry to the second pair of antenna feed terminals, and the second pair of antenna feed terminals is coupled between the additional elongated conductive member and an end of the second portion of the antenna resonating element arm that is adjacent to the additional gap.

14. An electronic device, comprising:
   a rectangular housing having four edges and peripheral conductive structures that run along at least some of the edges;
   first and second gaps in the peripheral conductive structures that define an antenna resonating element arm for an antenna;
   an antenna ground for the antenna;
   first and second elongated conductive members that extend respectively within first and second elongated openings that are formed between the antenna ground and the antenna resonating element arm, wherein the first and second elongated conductive members have respective outer ends;
   a first antenna feed that is coupled between the outer end of the first elongated conductive member and the antenna resonating element arm adjacent to the first gap; and
   a second antenna feed that is coupled between the outer end of the second elongated conductive member and the antenna resonating element arm adjacent to the second gap.

15. The electronic device defined in claim 14 wherein the first and second elongated openings form part of a U-shaped opening that extends around three of the edges.

16. The electronic device defined in claim 15 wherein the three edges include a lower edge of the housing and the antenna ground has a protruding portion adjacent to the lower edge from which the first and second elongated conductive members extend.

17. The electronic device defined in claim 16 further comprising:
   radio-frequency transceiver circuitry; and
   first and second transmission lines coupled to the radio-frequency transceiver circuitry and respectively extending along the first and second elongated conductive members to the first and second antenna feeds.

18. The electronic device defined in claim 17 wherein a first open slot for the antenna is formed between the first elongated conductive member and the antenna ground and a second open slot for the antenna is formed between the second elongated conductive member and the antenna ground.

19. The electronic device defined in claim 18 wherein the antenna is configured to exhibit a first resonance associated with the first open slot, a second resonance associated with the second open slot, a third antenna resonance associated with a first portion of the antenna resonating element arm, and a fourth resonance associated with a second portion of the antenna resonating element arm.

20. A cellular telephone, comprising:
   a housing having peripheral conductive structures that are separated from a ground by a U-shaped opening, wherein the ground forms part of an antenna;
   first and second gaps in the peripheral conductive structures at opposing ends of the U-shaped opening, wherein a portion of the peripheral conductive structures forms an antenna resonating element arm for the antenna and the first and second gaps form first and second respective ends of the antenna resonating element arm; and
   first and second elongated conductive structures that longitudinally bisect respective first and second portions of the U-shaped opening, wherein the first and second elongated conductive structures and the antenna ground form first and second respective open slots that serve as first and second slot antenna resonating elements for the antenna;
   an antenna feed coupled between an end of the first elongated conductive structure and the antenna resonating element arm; and
   a transmission line that extends along the first elongated conductive structure to the antenna feed.

21. The cellular telephone defined in claim 20 further comprising:
   an additional antenna feed coupled between an end of the second elongated conductive structure and the antenna resonating element arm;
   an additional transmission line that extends along the second elongated conductive member to the second antenna feed.

* * * * *